United States Patent
MacInnis

(10) Patent No.: US 9,578,319 B2
(45) Date of Patent: Feb. 21, 2017

(54) TRANSMISSION VARIABLE DELAY AND JITTER INDICATION

(71) Applicant: Broadcom Corporation, Irvine, CA (US)

(72) Inventor: Alexander MacInnis, Los Altos, CA (US)

(73) Assignee: BROADCOM CORPORATION, Irvine, CA (US)

(*) Notice: Subject to any disclaimer, the term of this patent is extended or adjusted under 35 U.S.C. 154(b) by 326 days.

(21) Appl. No.: 13/777,215

(22) Filed: Feb. 26, 2013

(65) Prior Publication Data

US 2013/0229574 A1    Sep. 5, 2013

Related U.S. Application Data

(60) Provisional application No. 61/606,040, filed on Mar. 2, 2012, provisional application No. 61/747,418, filed on Dec. 31, 2012.

(51) Int. Cl.

| | |
|---|---|
| H04N 17/00 | (2006.01) |
| H04N 21/41 | (2011.01) |
| H04N 21/43 | (2011.01) |
| H04N 21/4363 | (2011.01) |
| H04N 21/44 | (2011.01) |
| H04L 12/841 | (2013.01) |

(52) U.S. Cl.
CPC ............ *H04N 17/00* (2013.01); *H04L 47/283* (2013.01); *H04N 21/4122* (2013.01); *H04N 21/4305* (2013.01); *H04N 21/43637* (2013.01); *H04N 21/44004* (2013.01)

(58) Field of Classification Search
CPC ............ H04N 21/4122; H04N 21/4404; H04N 21/4305; H04N 21/44004; H04N 21/242; H04L 47/283; H04L 1/0042; H04L 43/087
See application file for complete search history.

(56) References Cited

U.S. PATENT DOCUMENTS

| | | | | |
|---|---|---|---|---|
| 5,437,342 | A | * | 8/1995 | Powada .................... 175/325.5 |
| 5,467,342 | A | * | 11/1995 | Logston et al. ............. 370/253 |
| 5,793,747 | A | * | 8/1998 | Kline ........................... 370/230 |
| 5,933,414 | A | * | 8/1999 | Georgiadis et al. .......... 370/238 |
| 7,526,000 | B2 | * | 4/2009 | Van Gestel .................. 370/516 |
| 2003/0223466 | A1 | * | 12/2003 | Noronha et al. ............. 370/537 |

(Continued)

*Primary Examiner* — Ian N Moore
*Assistant Examiner* — Phong La
(74) *Attorney, Agent, or Firm* — Foley & Lardner LLP

(57) ABSTRACT

Various methods and systems are provided for transmission variable delay and jitter indication. In one example, a method includes determining a variable delay reference (VDR) corresponding to an instantaneous jitter between an idealized transmission time associated with a packet for transmission in a transmission stream and an actual transmission time of the packet and providing the VDR to a receiver in a sub-header of the packet. In another example, a transmitter includes a MAC configured to include a VDR in a sub-header of a packet for transmission in a transmission stream and a PHY configured to transmit the packet including the VDR in the transmission stream. In another example, a method includes receiving a packet in a transmission stream; extracting a program clock reference (PCR) and a VDR from the packet information; and controlling timing of processing of the packet based upon the PCR and VDR.

22 Claims, 3 Drawing Sheets

(56) References Cited

U.S. PATENT DOCUMENTS

| | | | |
|---|---|---|---|
| 2005/0007957 A1* | 1/2005 | Ibaraki et al. | 370/235 |
| 2005/0036512 A1* | 2/2005 | Loukianov | 370/469 |
| 2005/0157729 A1* | 7/2005 | Rabie et al. | 370/395.53 |
| 2005/0190794 A1* | 9/2005 | Krause et al. | 370/485 |
| 2005/0237937 A1* | 10/2005 | Van Gestel | 370/235 |
| 2006/0045023 A1* | 3/2006 | Kim | H04L 1/24 370/252 |
| 2006/0209769 A1* | 9/2006 | Akamatsu et al. | 370/338 |
| 2007/0140398 A1* | 6/2007 | Inoue et al. | 375/372 |
| 2007/0162981 A1* | 7/2007 | Morioka et al. | 726/30 |
| 2009/0003379 A1* | 1/2009 | Shao | H04N 21/4122 370/466 |
| 2009/0288125 A1* | 11/2009 | Morioka | 725/110 |
| 2010/0040092 A1* | 2/2010 | Chang | 370/516 |
| 2010/0226366 A1* | 9/2010 | Lee et al. | 370/389 |
| 2011/0069720 A1* | 3/2011 | Jacobs et al. | 370/466 |
| 2011/0096790 A1* | 4/2011 | Sugai et al. | 370/412 |
| 2012/0207225 A1* | 8/2012 | Jeong | H04N 21/242 375/240.25 |
| 2013/0272272 A1* | 10/2013 | Sudak et al. | 370/336 |
| 2014/0317475 A1* | 10/2014 | Rozenberg | 714/774 |

\* cited by examiner

| | Program Number | Sequence Number | PCR | VDR | Flags |
|---|---|---|---|---|---|
| Octets: | 1 | 2 | 4 | 4 | 1 |

| | Program ID | Stream ID | Sequence Number | Flags | WDE STD Bit Rate | PCR | VDR | Frame Number |
|---|---|---|---|---|---|---|---|---|
| Octets: | 1 | 1 | 2 | 1 | 2 | 4 | 4 | 2 |

TRANSMISSION VARIABLE DELAY AND JITTER INDICATION

CROSS REFERENCE TO RELATED APPLICATIONS

This application claims priority to U.S. provisional application entitled "Transmission variable delay and jitter indication" having Ser. No. 61/606,040, filed Mar. 2, 2012, and U.S. provisional application entitled "Transmission variable delay and jitter indication" having Ser. No. 61/747,418, filed Dec. 31, 2012, the entirety of both applications is hereby incorporated by reference.

BACKGROUND

With the increase in demand for digital multimedia content, the desire for faster wireless connectivity to support wireless display and docking has also increased. Transmission jitter affects the ability to support low latency system operation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figures 1, 2:
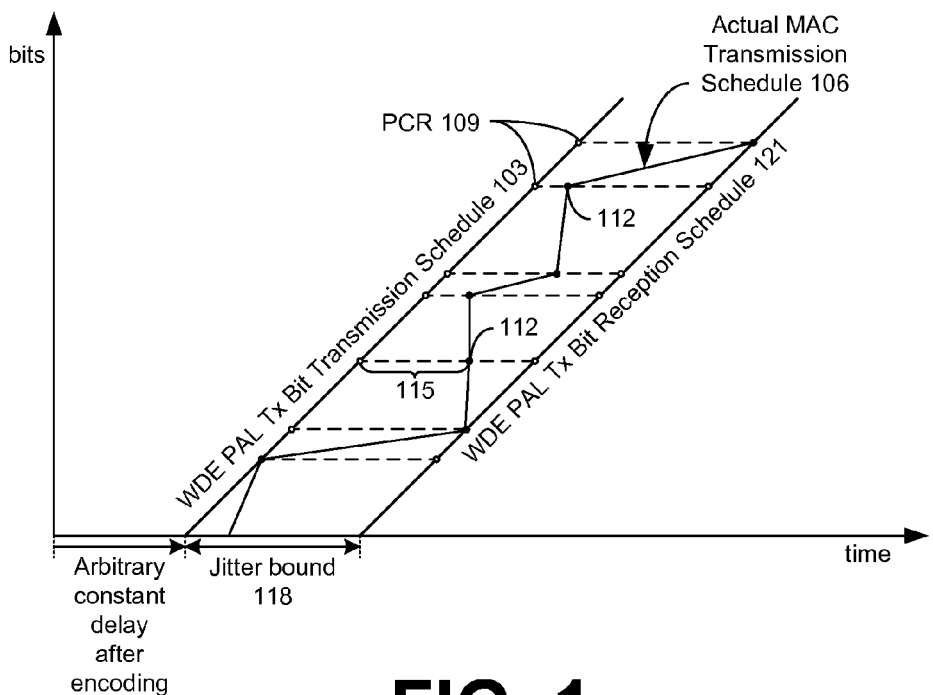
FIG. 1 is a graphical representation of an example of a WDE PAL audio-video data transmission schedule in accordance with various embodiments of the present disclosure.
FIG. 2 illustrates examples of WDE PAL data sub-header syntax in accordance with various embodiments of the present disclosure.

Disclosed herein are various embodiments of methods and systems related to transmission variable delay and jitter bound indication. Reference will now be made in detail to the description of the embodiments as illustrated in the drawings, wherein like reference numbers indicate like parts throughout the several views.

Devices that support wireless transmission in the gigabit range may include subsystems in an OSI-fashion beginning with a physical layer (PHY) at the bottom of the stack, a medium access control layer (MAC), and higher layers in the device. The PHY provides an electrical, mechanical, and procedural interface for wireless (or wired) transmission between devices. The MAC provides an interface between the PHY and the higher layers in the device. Protocol adaptation layers (PALs) support specific data and display standards for transmissions over, e.g., 60 GHz wireless gigabit (WiGig) networks. PALs allow wireless implementations of these standard interfaces that run in the PHY and MAC of, e.g., computers and consumer electronic devices. PALs can include, e.g., wireless (or WiGig) display extension (WDE) PALs, which can define support for HDMI and DisplayPort connections. WDE PALs may also be referred to as audio-visual (AV) PALs. PALs can also include, e.g., input-output (IO) PALs, which can define support for USB and PCIe connections. IO PALS include, e.g., wireless (or WiGig) bus extension (WBE) and wireless (or WiGig) serial extension (WSE).

WDE PALs allow wireless transmission of audio-visual data such as, e.g., movies from a computer, media player, or digital camera to a display device such as a television or projector. A WDE PAL can support wireless implementations of, e.g., HDMI and DisplayPort interfaces. The WDE PAL may also support schemes used to protect digital content transmitted over these interfaces such as, e.g., high-bandwidth digital content protection (HDCP). WDE PAL can also scale to allow transmission of compressed and uncompressed video.

Many transmission networks such as wireless (e.g., WiGig) and/or wired networks, the Internet, etc. contain variable delays downstream of the transmission source that results in jitter in the received packets. Variation in the delay of transmission of data may be referred to as jitter. This can make it difficult to recover the time base with low latency. This can be true for many transmission streams (e.g., video and/or audio transmissions) over point-to-point communication networks with arbitrary scheduling delays. For example, a WDE PAL transmitter sends a stream of packets to a WDE PAL receiver for processing and display. However, the WDE PAL specification is designed to support hard real-time system with tight timing constraints. Ideally, the WDE PAL receiver would receive the WDE PAL stream from the WDE PAL transmitter with a precise schedule. However, in reality, variable transmission delays such as, e.g., queuing delays in the MAC, processing requirements, and availability of air time for transmission produce deviations from the ideal transmission schedule and produce jitter in the actual MAC transmissions. FIG. 1 illustrates the relationship between the idealized WDE PAL transmission schedule 103 and the actual MAC transmission schedule 106 of packets in the WDE PAL stream.

The points 109 along the WDE PAL transmission schedule 103 are program clock references (PCRs) 109 that are similar to MPEG Transport Stream PCRs. The PCRs are samples of the WDE PAL system time clock (STC) without any jitter. In an ideal system, WDE PAL packets are transmitted at times corresponding to PCR 109 without any transmission delay or jitter. In reality, packets of the WDE PAL stream are transmitted at varying times as illustrated by the points along the actual MAC transmission schedule 106. Transmission jitter produced by variable delays from the precise schedule 103 imposes an additional burden on the WDE PAL receiver. If the receiver does not know the value of the instantaneous delay or jitter for a packet, the receiver does not know how the actual reception time for that packet deviates from the schedule indicated by the PCRs. For example, an individual packet could have very little transmission delay, a large transmission delay, or any other value of transmission delay.

In order to design for robust operation, the receiver may be designed to accommodate any potential value of instantaneous transmission delay for each packet. Whereas a PCR value may accurately represent the time that a packet would be received by a receiver if there were no jitter, the value of a PCR in a packet that has experienced jitter or variable transmission delay may be relatively inaccurate. To avoid problems in the receiver's displayed video, such as buffer overflow or underflow, and corresponding potential data corruption, display timing irregularities, frame drops and/or repeats, processing and/or display of the WDE PAL stream may be delayed at the receiver, which requires additional buffer space and adds undesirable latency to the system operation. Further, if a receiver attempts to reconstruct the WDE PAL STC based on the received PCRs, and if the reception times of those PCRs have variable values of transmission delay, the jitter in the received PCRs may cause inaccuracies and/or delays in synchronizing the receiver to the WDE PAL STC.

The jitter may be accounted for by determining the instantaneous jitter 115 in the MAC and/or WDE PAL before transmission of the packet. By providing both the PCR 109 and the instantaneous jitter 115 information to the WDE PAL receiver, the receiver can compensate for the transmission jitter when recovering the STC time base and clock frequency, thereby substantially eliminating inaccuracies and delays in synchronization to the source time base. The receiver can determine how late the transmitted data is because of the jitter. With this information, the WDE PAL receiver can optimally control the timing of decoding and display of the associated packet for minimum latency and minimum buffering, while avoiding issues of buffer overflow or underflow.

The instantaneous jitter 115 associated with a packet may be indicated as a variable delay reference (VDR). A VDR provides an indication of the amount of time, which may be subject to a constant delay term, between the scheduled and the actual transmission times of the packet, or of a PCR field of the packet. For example, the VDR is preferably a non-negative integer that directly indicates the variable component of delay between the scheduled time indicated by PCR 109 and the actual transmission time 112 of the WDE PAL packet. Each integer unit can correspond to a defined period of time. The VDR may be in units of the STC frequency (e.g., 27 MHz or 90 kHz) or may be based upon another clock frequency. In some implementations, an independent clock may be used to obtain the frequency. Preferably, a value of zero indicates a minimum jitter (or shortest possible delay of the transmission). All of the transmission delays would be greater than or equal to this minimum jitter, which would be known by the MAC. In one embodiment, the WDE PAL transmitter may create a PCR for each packet and the MAC may create the VDR for each packet. In another embodiment, the WDE PAL transmitter may create a PCR for a subset of packets, and the MAC may create a VDR for each packet that has a PCR, with exceptions under certain conditions such as the packet being re-transmitted. In an exemplary embodiment, the 27 MHz STC is used to generate the VDR. In certain interoperability specifications, the VDR may be permitted to have an error of up to, for example, 10 µs, for example to enable various forms of implementation.

The syntax of PCR 109 and VDR for the instantaneous jitter 115 may be provided by the WDE PAL transmitter to the WDE PAL receiver as part of WDE PAL data sub-header syntax of each packet. FIG. 2 illustrates examples of sub-header syntax including the PCR and VDR information in addition to a program number, sequence number, and other flags. In the examples of FIG. 2, the number of bytes is indicated for each field. In the examples of FIG. 2, the PCR and the VDR occupy 4 bytes each. In some embodiments, the PCR and/or VDR fields may be selected so that the sub-header is a multiple of 4. The number of bytes for the VDR may be based upon the frequency used to measure the instantaneous jitter 115 (FIG. 1) and the maximum jitter that is to be measured. For example, the VDR may be, e.g., 1, 2, 3, or more bytes depending on the needed resolution and range.

In the case where a packet is retransmitted to the receiver, the VDR may be updated to account for the additional delay. The updated VDR indicates the delay between the PCR 109 and the actual retransmission time. In this way, the WDE PAL receiver can adjust for the retransmission delay of the packet. In alternative embodiments, where a packet is re-transmitted to the receiver without updating the VDR, an indication may be included to indicate that the VDR is not valid.

A transmission jitter bound allows for interoperability of the WDE PAL receiver and transmitter. Referring back to FIG. 1, a jitter bound 118 is the time between the WDE PAL ideal transmission schedule 103 and the WDE PAL reception schedule 121 that represents the maximum value of the variable component of delay expected by the WDE PAL receiver under normal operating conditions. The jitter bound 118 may be in the range of, for example, about 1 ms to about 10 ms or more. For example, the jitter bound may be 1 ms, which corresponds to 2 Mbits at 2 Gbps. In other cases, the jitter bound may be as large as, e.g., 20 ms or more. The jitter bound 118 can be a predefined value or may be a value determined by the WDE PAL receiver and transmitter. The jitter bound 118 is set to avoid buffer overflow and underflow during normal operation of the WDE PAL receiver. The jitter bound 118 applies to normal operation or normal conditions.

When the instantaneous jitter 115, as indicated by the VDR, exceeds the jitter bound 118 during abnormal operation, errors may result and error concealment may be utilized by the receiver. For example, a flag may be set in the sub-header to indicate that the jitter bound has been exceeded. When the instantaneous jitter 115 exceeds the jitter bound 118, a buffer in the receiver may become empty or underflow, and the receiver may take corrective action by, for example, repeating a frame and delaying the decoding and display of additional data by a frame period. Knowledge of the jitter bound also allows for optimization of the WDE PAL receiver design to handle the transmission jitter. In some implementations, the instantaneous jitter 115 may be monitored over time to determine the maximum delay seen over that time. The jitter bound 118 may be adjusted based upon the monitored values. For example, the jitter bound may be sent at an appropriate level for measurement that is slightly above the maximum delay that was detected. As shown in FIG. 1, an arbitrary constant delay may be accounted for before the WDE PAL transmission schedule 103. The constant delay may be eliminated from the determination of variable delay or jitter.

Figure 3:
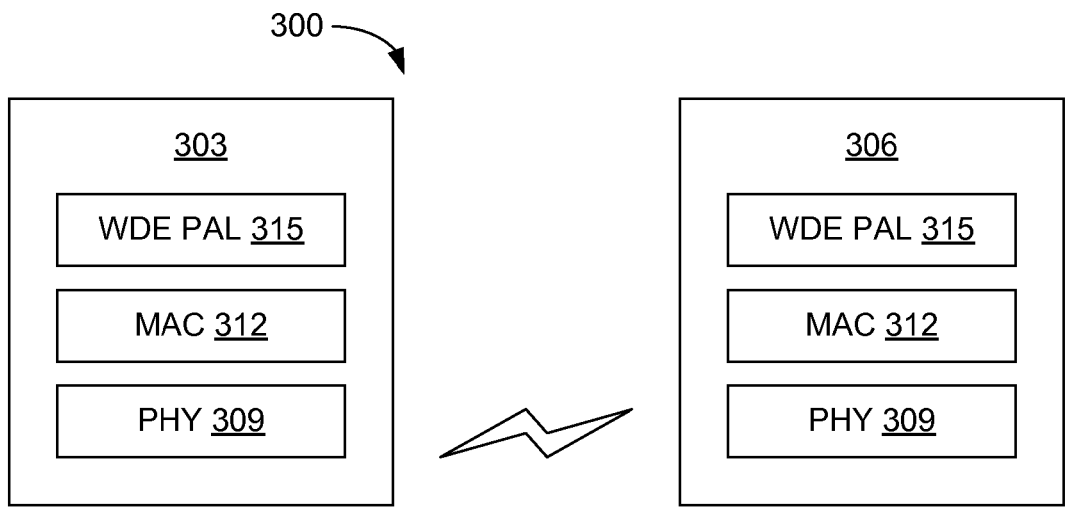
FIG. 3 is a graphical representation of an example of a system for wireless transmission of WDE PAL audio-video data in accordance with various embodiments of the present disclosure.

Referring now to FIG. 3, shown is a graphical representation of a system for wireless transmission of WDE PAL audio-video data in accordance with various embodiments of the present disclosure. The system 300 includes a WDE PAL transmitter (or transceiver) 303 and a WDE PAL receiver (or transceiver) 306. The WDE PAL transmitter 303 and receiver 306 each include a PHY 309, MAC 312, and WDE PAL 315. The PHY 309 provides an interface for wireless communications between the WDE PAL transmitter 303 and receiver 306 (or transceivers). The MAC provides an interface between the PHY 309 and the higher layers in the transmitter 303 and receiver 306. The WDE PAL 315 supports the wireless (or WiGig) display extension protocols. The WDE PAL 315 may be separate from the MAC 312 as illustrated in FIG. 3, or may be integrated with the MAC 312. In one embodiment, the WDE PAL 315 may include the STC and may communicate PCR syntax and information and VDR syntax to the MAC 312 for inclusion as part of WDE PAL data sub-header syntax of each packet transmitted by the WDE PAL transmitter 303 to the WDE PAL receiver 306. The MAC 312 may determine the VDR information and encode it in the VDR syntax in the WDE PAL data sub-header.

The WDE PAL transmitter (or transceiver) 303 and WDE PAL receiver (or transceiver) 306 include processing circuitry that implements the PHY 309, MAC 312, and WDE PAL 315. In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute encoding functions.

For accurate display of the AV data in the received packets, the time base of the WDE PAL receiver 306 can be locked to the STC of the WDE PAL transmitter 303. This can avoid frame slipping in the displayed AV data. The VDR may be used to lock the time base of the WDE PAL receiver 306. Because the jitter 115 is known, the PCR 109 and VDR may be combined to get an accurate measure of the source time base for quick and accurate synchronization with the STC. Because the jitter 115 is known, the WDE PAL receiver 306 can determine an appropriate amount of delay to apply between the reception of packets of AV data and the decoding of the packets and/or the display of the decoded AV data. An appropriate amount of delay may be an amount that avoids overflow and underflow of a buffer in the WDE PAL receiver 306 under normal operating conditions.

Figure 4:
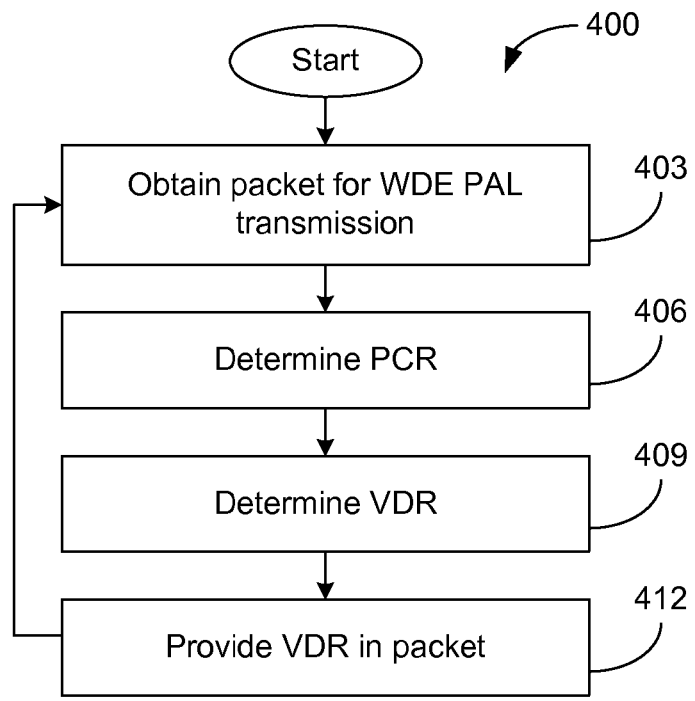
FIG. 4 is a flowchart illustrating an example of transmission of VDR information in the system of FIG. 3 in accordance with various embodiments of the present disclosure.

Referring next to FIG. 4, shown is a flowchart 400 illustrating an example of transmission of the VDR information by, e.g., WDE PAL transmitter (or transceiver) 303 of FIG. 3. Beginning with 403, a packet for transmission in a WDE PAL stream is obtained. For example, the packet may be obtained by the MAC 312 (FIG. 3) from an output of a first-in-first-out (FIFO) buffer that is supplied by an encoder. In other embodiments, the packet may be obtained directly from the encoder. In 406, the PCR is determined. For instance, the PCR may be determined by the WDE PAL 315 (FIG. 3). In 409, the VDR is determined. The VDR corresponds to the instantaneous jitter between the ideal schedule associated with the PCR associated with the packet and the actual transmission time of the packet. The VDR may be determined by the MAC 312. In some implementations, the VDR may be determined by the WDE PAL 315 (FIG. 3) and provided to the MAC 312, e.g., just before transmission of the packet. In some cases, the instantaneous jitter corresponds to the time the packet was in a FIFO buffer. The MAC 312 includes the VDR in a sub-header of the packet. In 412, the VDR is provided to a WDE PAL receiver in a sub-header of the packet. The sub-header may also include the PCR, which may be determined by the WDE PAL transmitter. The flow may then return to 403 to process the next packet.

Figure 5:
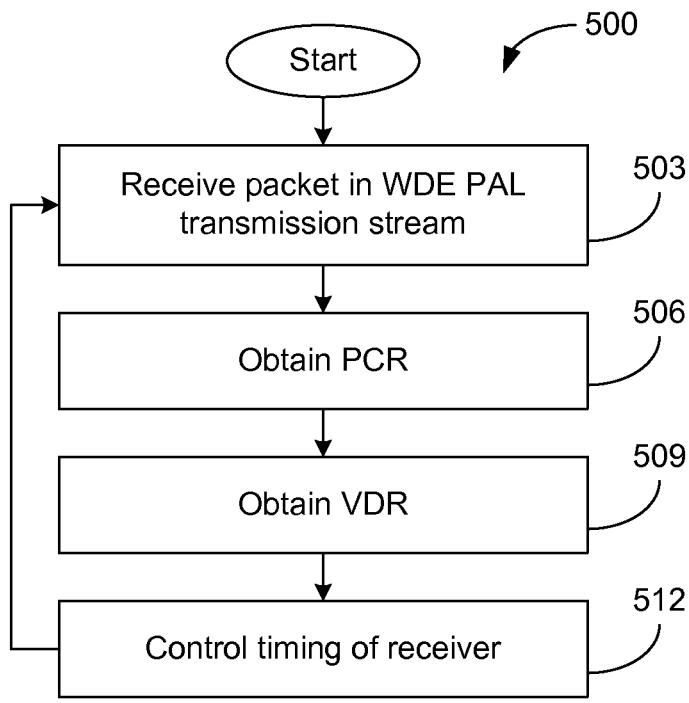
FIG. 5 is a flowchart illustrating an example of reception of VDR information in the system of FIG. 3 in accordance with various embodiments of the present disclosure.

Referring to FIG. 5, shown is a flowchart 500 illustrating an example of receipt of the VDR information by, e.g., a WDE PAL receiver (or transceiver) 306 of FIG. 3. Beginning with 503, a packet is obtained in a WDE PAL stream transmission. In 506, the PCR associated with the packet is obtained and, in 509, the VDR corresponding to the instantaneous jitter between the ideal transmission schedule and the actual transmission time of the packet is obtained from the packet information. For example, a field of the sub-header syntax (FIG. 2) may be read to obtain the information. In some cases, the field may be read and processed as part of the extraction and the field may remain in the syntax after extraction. The extraction may be carried out by the MAC 312 and/or by the WDE PAL 315 of the WDE PAL receiver 306 (FIG. 3). In some implementations, the PCR may be obtained by the MAC 312 and the VDR may be obtained by the WDE PAL 315. In 512, timing of the operation of the WDE PAL receiver 306 may be controlled based upon the PCR and VDR. In some embodiments, the timing of the display of decoded packet information is also controlled based upon the PCR and VDR. In an exemplary embodiment, the receiver may utilize the sum of the PCR and VDR (e.g., PCR+VDR) in a control system to control the timing of aspects of the receiver operation. For example, the PCR 109 and VDR may be combined to get an accurate measure of the source time base for quick and accurate synchronization with the STC of the WDE PAL transmitter 303.

Figure 6:
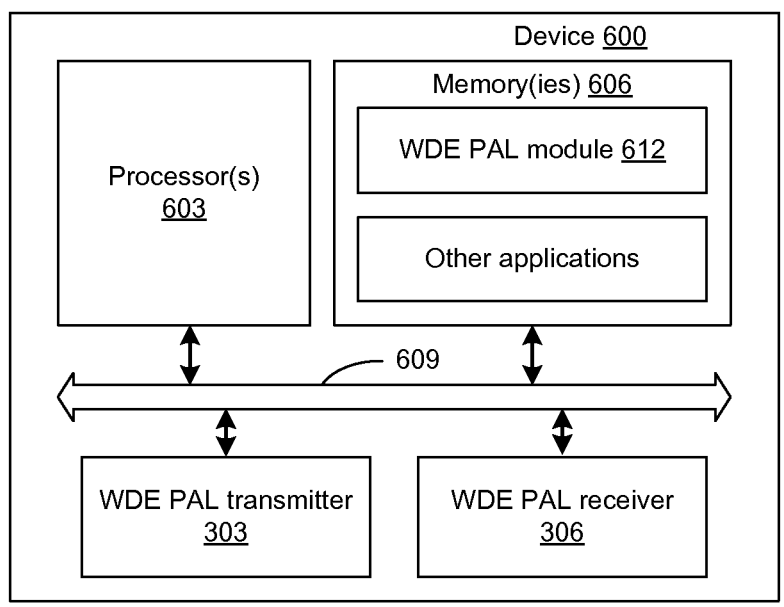
FIG. 6 is a schematic block diagram of an example of a device for WDE PAL transmission in accordance with various embodiments of the present disclosure.

With reference to FIG. 6, shown is a schematic block diagram of a device including a WDE PAL transmitter 303 and/or receiver 306 (or transceiver) in accordance with various embodiments of the present disclosure. The device 600 includes at least one processor circuit, for example, having a processor 603 and a memory 606, both of which are coupled to a local interface 609. The device 600 may include processing circuitry for implementing the WDE PAL transmitter 303 and/or receiver 306, all of which may be coupled to the local interface 609. In various embodiments, at least a portion of the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data processing functions. In some cases, portions of the WDE PAL transmitter 303 and/or receiver 306 may be implemented by processor 603 via local interface 609. The local interface 609 may comprise, for example, a data bus with an accompanying address/control bus or other bus structure as can be appreciated.

Stored in the memory 606 are both data and several components that are executable by the processor 603 and/or by processing circuitry of the WDE PAL transmitter 303 and/or receiver 306. In particular, stored in the memory 606 and executable by the processor 603 and/or processing circuitry of the WDE PAL transmitter 303 and/or receiver 306 may be a WDE PAL module 612 and potentially other applications and device interfaces. In addition, an operating system may be stored in the memory 606 and executable by the processor 603 or other processing circuitry of the device 600. In some cases, the processor 603 and memory 606 may be integrated as a system-on-a-chip.

It is understood that there may be other applications that are stored in the memory and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components can be stored in the memory and are executable by the processor 603 or other processing circuitry of the device 600. In this respect, the term "executable" means a program file that is in a form that can ultimately be run by the processor 603 or other processing circuitry of the device 600. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the WDE PAL module 612 and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the WDE PAL module 612 and/or logic implemented by processing circuitry of the device 600. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the WDE PAL module 612 that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
determining a variable delay reference (VDR) corresponding to an instantaneous jitter between an idealized transmission time associated with a packet for transmission in a transmission stream and an actual transmission time of the packet;
determining a jitter bound, by a protocol adaptation layer (PAL), using a transmission delay between the idealized transmission time and an expected transmission time for packets under normal operating conditions, determining the jitter bound comprising at least one of:
determining a predefined value representing the delay under normal operating conditions; or
monitoring the instantaneous jitter over time and determining the jitter bound using a largest detected delay;
providing the VDR to a receiver in response to determining the VDR does not exceed the jitter bound; and
providing an indication the jitter bound has been exceeded to the receiver in response to determining the VDR exceeds the jitter bound.

2. The method of claim 1, wherein the VDR is determined by a medium access control layer (MAC).

3. The method of claim 1, wherein the transmission stream is a wireless display extension (WDE) protocol adaptation layer (PAL) stream.

4. The method of claim 1, wherein the packet includes a program clock reference (PCR) in a sub-header of the packet, the PCR determined by the protocol adaptation layer (PAL).

5. The method of claim 1, wherein the idealized transmission time is using one or more program clock reference (PCR).

6. The method of claim 1, further comprising obtaining the packet from a FIFO buffer, whose contents comprise data supplied by an encoder.

7. The method of claim 6, wherein the instantaneous jitter corresponds to a time the packet was in the FIFO buffer.

8. The method of claim 1, further comprising retransmitting the packet including a retransmission VDR corresponding to the instantaneous jitter between the idealized transmission time associated with the packet and the actual retransmission time of the packet.

9. The method of claim 1, further comprising retransmitting the packet including the VDR, the retransmitted packet including an indication that the VDR is not valid.

10. The method of claim 1, wherein determining the jitter bound comprises determining the predefined value representing the delay under normal operating conditions.

11. The method of claim 1, wherein determining the jitter bound comprises monitoring the instantaneous jitter over time and determining the jitter bound using the largest detected delay.

12. A transmitter, comprising:
circuitry configured to implement:
a medium access control layer (MAC) configured to include a variable delay reference (VDR) in a sub-header of a packet for transmission in a transmission stream, where the VDR corresponds to an instantaneous jitter between an idealized transmission time associated with the packet and an actual transmission time of the packet;
a protocol adaptation layer (PAL) configured to determine a jitter bound using a transmission delay between the idealized transmission time and an expected transmission time for packets under normal operating conditions, wherein the MAC is configured to set a flag in the sub-header of the packet to indicate that the jitter bound has been exceeded; and
a physical layer (PHY) configured to
transmit the packet including the VDR in the transmission stream in response to determining the VDR does not exceed the jitter bound; and
provide an indication the jitter bound has been exceeded to the receiver in response to determining the VDR exceeds the jitter bound.

13. The transmitter of claim 11, wherein the MAC is further configured to determine the VDR.

14. The transmitter of claim 11, wherein the MAC is further configured to include a program clock reference (PCR) in the sub-header of the packet, the PCR corresponding to the idealized transmission time associated with the packet.

15. The transmitter of claim 14, wherein the protocol adaptation layer (PAL) is a wireless display extension (WDE) PAL configured to determine the PCR for inclusion by the MAC.

16. The transmitter of claim 11, wherein the MAC is configured to obtain the packet from a FIFO buffer, whose contents comprise data supplied by an encoder.

17. The transmitter of claim 11, wherein the MAC is configured to include a retransmission VDR in the sub-header in response to a retransmission of the packet, where the retransmission VDR corresponds to the instantaneous jitter between the idealized transmission time associated with the packet and an actual retransmission time of the packet.

18. A method, comprising:
    receiving a variable delay reference (VDR) associated with a packet in a transmission stream, wherein the VDR corresponds to an instantaneous jitter between an idealized transmission time of the packet and an actual transmission time of the packet;
    extracting a program clock reference (PCR) associated with the packet and extracting the VDR from the information of the packet;
    controlling timing of processing of the packet based upon the PCR and VDR;
    receiving an indication of whether an jitter bound has been exceeded associated with the packet, the jitter bound associated with a transmission delay between the idealized transmission time and an expected transmission time for packets under normal operating conditions, wherein the jitter bound is determined by at least one of:
        determining a predefined value representing the delay under normal operating conditions; or
        monitoring the instantaneous jitter over time and determining the jitter bound using a largest detected delay;
    extracting the indication associated with the packet; and
    utilizing an error concealment and a corrective action in response to determining the VDR exceeds the jitter bound using the indication.

19. The method of claim 18, further comprising controlling timing of display of decoded packet information based upon the PCR and VDR.

20. The method of claim 18, further comprising determining a source time using the PCR and VDR.

21. The method of claim 1, wherein providing an indication the jitter bound has been exceeded to the receiver comprises setting a flag in a sub-header of the packet to indicate that the VDR exceeds the jitter bound.

22. The method of claim 18, wherein the corrective action comprises repeating a frame and delaying the decoding and display of additional data by a frame period.

* * * * *